(12) United States Patent
Trainor et al.

(10) Patent No.: US 7,982,439 B2
(45) Date of Patent: *Jul. 19, 2011

(54) SYSTEM FOR ENERGY HARVESTING AND/OR GENERATION, STORAGE, AND DELIVERY

(75) Inventors: John T. Trainor, Albuquerque, NM (US); Patrick Franz Fleig, Albuquerque, NM (US); Charles D. E. Lakeman, Albuquerque, NM (US); Jenniffer Leigh DeGreeff, Albuquerque, NM (US)

(73) Assignee: TPL, Inc., Albuquerque, NM (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/752,593

(22) Filed: Apr. 1, 2010

(65) Prior Publication Data

US 2010/0315046 A1    Dec. 16, 2010

Related U.S. Application Data

(63) Continuation of application No. 11/620,017, filed on Jan. 4, 2007, now Pat. No. 7,692,411.

(60) Provisional application No. 60/756,876, filed on Jan. 5, 2006, provisional application No. 60/824,755, filed on Sep. 6, 2006.

(51) Int. Cl.
*H02J 7/00* (2006.01)
*H02M 1/00* (2007.01)
*H02M 3/18* (2006.01)
*H02M 3/06* (2006.01)

(52) U.S. Cl. ............ 320/166; 363/49; 363/59; 307/109; 307/110

(58) Field of Classification Search .................... 320/166
See application file for complete search history.

(56) References Cited

U.S. PATENT DOCUMENTS

| | | | |
|---|---|---|---|
| 2,800,616 | A | 7/1957 | Becker |
| 2,998,550 | A | 8/1961 | Collins et al. |
| 3,584,244 | A | 6/1971 | Vest |

(Continued)

FOREIGN PATENT DOCUMENTS

TW    529230    4/2003

OTHER PUBLICATIONS

Boyle, Timothy J. et al., "REchargeable Lithium Battery Cathodes. Nonaqueous Synthesis, Characterization, and Electrochemical Properties of LiCoO2", *Chem. Mater.* vol. 10, No. 8 1998, 2270-2276.

(Continued)

*Primary Examiner* — Patrick J Assouad
*Assistant Examiner* — Yalkew Fantu
(74) *Attorney, Agent, or Firm* — Philip D. Askenazy; Peacock Myers, P.C.

(57) ABSTRACT

A device and method for harvesting, generating, storing, and delivering energy to a load, particularly for remote or inaccessible applications. The device preferably comprises one or more energy sources, at least one supercapacitor, at least one rechargeable battery, and a controller. The charging of the energy storage devices and the delivery of power to the load is preferably dynamically varied to maximize efficiency. A low power consumption charge pump circuit is preferably employed to collect power from low power energy sources while also enabling the delivery of higher voltage power to the load. The charging voltage is preferably programmable, enabling one device to be used for a wide range of specific applications.

25 Claims, 11 Drawing Sheets

U.S. PATENT DOCUMENTS

| | | |
|---|---|---|
| 3,648,126 A | 3/1972 | Boos et al. |
| 3,787,240 A | 1/1974 | Gillman et al. |
| 3,816,807 A | 6/1974 | Taylor |
| 3,925,098 A | 12/1975 | Saunders et al. |
| 3,969,149 A | 7/1976 | Thomas et al. |
| 4,012,562 A | 3/1977 | Saunders |
| 4,306,115 A | 12/1981 | Humphrey |
| 4,438,481 A | 3/1984 | Phillips et al. |
| 4,562,511 A | 12/1985 | Nishino et al. |
| 4,597,028 A | 6/1986 | Yoshida et al. |
| 4,709,303 A | 11/1987 | Fujiwara et al. |
| 4,725,927 A | 2/1988 | Morimoto et al. |
| 4,842,963 A | 6/1989 | Ross, Jr. |
| 5,001,649 A | 3/1991 | Lo et al. |
| 5,041,946 A | 8/1991 | Iseki |
| 5,065,286 A | 11/1991 | Kurabayashi et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |
| 5,099,398 A | 3/1992 | Kurabayashi et al. |
| 5,102,745 A | 4/1992 | Tatarchuk et al. |
| 5,121,301 A | 6/1992 | Kurabayashi et al. |
| 5,136,472 A | 8/1992 | Tsuchiya et al. |
| 5,142,451 A | 8/1992 | Kurabayashi et al. |
| 5,150,283 A | 9/1992 | Yoshida et al. |
| 5,151,848 A | 9/1992 | Finello |
| 5,304,330 A | 4/1994 | Tatarchuk et al. |
| 5,319,518 A | 6/1994 | Blood |
| 5,338,625 A | 8/1994 | Bates et al. |
| 5,357,423 A | 10/1994 | Weaver et al. |
| 5,425,704 A | 6/1995 | Sakurai et al. |
| 5,426,561 A | 6/1995 | Yen et al. |
| 5,429,893 A | 7/1995 | Thomas |
| 5,512,147 A | 4/1996 | Bates et al. |
| 5,567,210 A | 10/1996 | Bates et al. |
| 5,587,259 A | 12/1996 | Dopp et al. |
| 5,606,213 A | 2/1997 | Kherani et al. |
| 5,621,607 A | 4/1997 | Farahmandi et al. |
| 5,636,147 A | 6/1997 | Tolmie et al. |
| 5,659,457 A | 8/1997 | Lian et al. |
| 5,777,428 A | 7/1998 | Farahmandi et al. |
| 5,818,125 A * | 10/1998 | Manchester .................. 307/66 |
| 5,862,035 A | 1/1999 | Farahmandi et al. |
| 5,872,698 A | 2/1999 | Bai et al. |
| 5,907,472 A | 5/1999 | Farahmandi et al. |
| 5,928,808 A | 7/1999 | Eshraghi |
| 5,989,300 A | 11/1999 | Eshraghi |
| 6,011,379 A | 1/2000 | Singh et al. |
| 6,059,847 A | 5/2000 | Farahmandi et al. |
| D427,144 S | 6/2000 | Buckle |
| 6,094,788 A | 8/2000 | Farahmani et al. |
| 6,197,450 B1 | 3/2001 | Nathan et al. |
| 6,212,431 B1 | 4/2001 | Hahn et al. |
| 6,233,135 B1 | 5/2001 | Farahmandi et al. |
| 6,264,709 B1 | 7/2001 | Yoon et al. |
| 6,265,851 B1 | 7/2001 | Brien et al. |
| 6,310,789 B1 * | 10/2001 | Nebrigic et al. ................ 363/60 |
| 6,315,568 B1 | 11/2001 | Hull et al. |
| 6,340,787 B1 | 1/2002 | Simeray et al. |
| 6,370,046 B1 | 4/2002 | Nebrigic et al. |
| 6,395,423 B1 | 5/2002 | Kawakami et al. |
| 6,402,796 B1 | 6/2002 | Johnson |
| 6,449,139 B1 | 9/2002 | Farhmandi et al. |
| 6,451,073 B1 | 9/2002 | Farahmandi et al. |
| 6,456,988 B1 | 9/2002 | Singh et al. |
| 6,468,690 B1 | 10/2002 | Barker et al. |
| 6,479,919 B1 | 11/2002 | Aselage et al. |
| 6,558,836 B1 | 5/2003 | Whitacre et al. |
| 6,585,152 B2 | 7/2003 | Farahmandi et al. |
| 6,586,133 B1 | 7/2003 | Teeters et al. |
| 6,610,440 B1 | 8/2003 | LaFollette et al. |
| 6,615,074 B2 | 9/2003 | Mickle et al. |
| 6,621,687 B2 | 9/2003 | Lewis, Jr. et al. |
| 6,627,252 B1 | 9/2003 | Nanjundiah et al. |
| 6,646,415 B1 | 11/2003 | Nebrigic et al. |
| 6,671,165 B1 | 12/2003 | Nakazawa et al. |
| 6,737,830 B2 | 5/2004 | Bean et al. |
| 6,804,108 B2 | 10/2004 | Nanjundiah et al. |
| 6,807,853 B2 | 10/2004 | Adamson et al. |
| 6,841,456 B2 | 1/2005 | Hersee et al. |
| 6,842,330 B2 | 1/2005 | Farahmandi et al. |
| 6,858,970 B2 | 2/2005 | Malkin et al. |
| 6,861,170 B2 | 3/2005 | Lewis, Jr. et al. |
| 6,894,460 B2 | 5/2005 | Clingman |
| 6,914,412 B2 | 7/2005 | Wang et al. |
| 6,936,994 B1 | 8/2005 | Gimlan |
| 6,951,456 B2 | 10/2005 | Cohen et al. |
| 6,954,025 B2 | 10/2005 | Nishida et al. |
| 6,995,496 B1 | 2/2006 | Hagood, IV et al. |
| 7,081,693 B2 * | 7/2006 | Hamel et al. .................. 307/151 |
| 7,090,706 B2 | 8/2006 | Farahmandi et al. |
| 7,116,545 B2 | 10/2006 | Farahmandi et al. |
| 7,224,077 B2 | 5/2007 | Allen |
| 7,498,681 B1 | 3/2009 | Kellogg et al. |
| 2001/0033501 A1 * | 10/2001 | Nebrigic ......................... 363/49 |
| 2001/0033971 A1 | 10/2001 | Zhao et al. |
| 2002/0084188 A1 | 7/2002 | Tran et al. |
| 2003/0099884 A1 | 5/2003 | Chiang et al. |
| 2003/0118884 A1 | 6/2003 | Hampden-Smith et al. |
| 2003/0152815 A1 | 8/2003 | LaFollette et al. |
| 2003/0185742 A1 | 10/2003 | Watanabe et al. |
| 2004/0002002 A1 | 1/2004 | Mizuta et al. |
| 2004/0072683 A1 | 4/2004 | Kodas et al. |
| 2004/0074784 A1 | 4/2004 | Anex et al. |
| 2004/0078662 A1 | 4/2004 | Hamel et al. |
| 2004/0161640 A1 | 8/2004 | Salot |
| 2004/0261743 A1 | 12/2004 | Kelling et al. |
| 2005/0012434 A1 | 1/2005 | Pizzochero et al. |
| 2005/0082942 A1 | 4/2005 | Shirley |
| 2005/0115600 A1 | 6/2005 | DeSteese et al. |
| 2005/0115601 A1 | 6/2005 | Olsen et al. |
| 2005/0146220 A1 | 7/2005 | Hamel et al. |
| 2005/0164085 A1 | 7/2005 | Bofinger et al. |
| 2005/0225213 A1 | 10/2005 | Richards et al. |
| 2005/0285728 A1 | 12/2005 | Tyndall |
| 2006/0133003 A1 | 6/2006 | Kular et al. |
| 2006/0155270 A1 | 7/2006 | Hancock et al. |
| 2006/0220843 A1 | 10/2006 | Broad et al. |
| 2006/0226844 A1 | 10/2006 | Broad |
| 2006/0226990 A1 | 10/2006 | Broad et al. |
| 2006/0229086 A1 | 10/2006 | Broad et al. |
| 2008/0122518 A1 | 5/2008 | Besser et al. |

OTHER PUBLICATIONS

Greenwood, J. A., "Constriction resistance and the real area of contact", *Brit. J. Appl. Phys.* vol. 17 1966, 1621-1632.

Jackman, Rebecca J. et al., "Fabrication of Submicrometer Features on Curved Substrates by Microcontact Printing", *Science* vol. 269 Aug. 4, 1995, 664-665.

Jeon, N. L. et al., "Patterning of dielectric oxide thin layers by microcontact printing of self-assembled monolayers", *Journal of Materials Research* vol. 10, No. 12 Dec. 1995, 2996-2999.

Jiang, Xiaofan et al., "Perpetual Environmentally Powered Sensor Networks", *In Proccedings of IPSN/SPOTS*, Los Angeles, CA, Apr. 25-27, 2005.

Kumar, Amit et al., "Patterning Self-Assembled Monolayers: Applications in Materials Science", *Langmuir* vol. 10, American Chemical Society 1994, 1498-1511.

Linden, David et al., *Handbook of Batteries* 3rd Edition, McGraw-Hill, Inc. 2002, 35.20-35.23, 35.71-35.74.

Pique, a. et al., "Laser Direct Writing of Microbatteries for Integrated Power Electronics", *SPIE's LASE '2001* Jan. 20-26, 2001.

Polastre, Joseph, "Telos: Fourth Generation WSN Platform", *TinyOS Technology Exchange II* Feb. 11, 2005, 1-12.

Salmon, L. G. et al., "Fabrication of rechargeable microbatteries for microelectrochemical system (MEMS) applications", *Proceedings of the Intersociety Energy Conversion Engineering Conference, 33rd* 1998.

Kim, Hyeoung W. et al., "Energy Harvesting Using a Piezoelectric "Cymbal" Transducer in Dynamic Environment", *Japanese Journal of Applied Physics* vol. 43, No. 9A, The Japan Society of Applied Physics 2004, 6178-6183.

Kobayashi, Shigeru et al., "Output Control of Actuator based on Dynamic Impedance Matching", *Conference IEEE SMC \'93* 1993, 441/446.

Maurath, Dominic et al., "High Efficiency, Low-Voltage and Self-Adjusting Charge Pump with Enhanced Impedance Matching", *51st Midwest Symposium on Circuits and Systems, IEEE* 2008, 189-192.

Stephen, N. G., "On energy harvesting from ambient vibration", *Journal of Sound and Vibration* vol. 293, Elsevier, Ltd. 2006, 409-423.

* cited by examiner

Voltage Output Doubling

SYSTEM FOR ENERGY HARVESTING AND/OR GENERATION, STORAGE, AND DELIVERY

CROSS-REFERENCE TO RELATED APPLICATIONS

This application is a continuation application of U.S. patent application Ser. No. 11/620,017, entitled "System for Energy Harvesting and/or Generation, Storage, And Delivery", filed on Jan. 4, 2007, issuing as U.S. Pat. No. 7,692,411 on Apr. 6, 2010, which application claims the benefit of the filing of U.S. Provisional Patent Application Ser. No. 60/756, 876, entitled "System for Energy Harvesting and/or Generation, Storage, and Delivery", filed on Jan. 5, 2006, and U.S. Provisional Patent Application Ser. No. 60/824,755, entitled "Circuits for Energy Harvesting and/or Generation, Storage, and Delivery", filed on Sep. 6, 2006.

The application is related to U.S. Provisional Patent Application Ser. No. 60/824,749, entitled "Electric Double Layer Capacitors Having Low Equivalent Series Resistance", filed on Sep. 6, 2006, U.S. patent application Ser. No. 10/796,329, entitled "Lithium Ion Battery", filed on Mar. 8, 2004, U.S. patent application Ser. No. 10/796,532, entitled "MEMS Electrochemical Power System", filed on Mar. 8, 2004, U.S. Pat. No. 6,861,170, entitled "Volumetric Micro Batteries", and U.S. Pat. No. 6,621,687, entitled "Micro-Supercapacitor". The specifications and claims of all of the above patents and patent applications are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract Nos. W31P4Q-04-C-R346 awarded by DARPA, FA8650-05-C-2613 awarded by AFRL, and NNL06AA06C awarded by NASA.

BACKGROUND OF THE INVENTION

1. Field of the Invention (Technical Field)

The present invention is related to miniature systems for harvesting, generating, storing, and delivering energy, and implementation thereof.

2. Background Art

Note that the following discussion refers to a number of publications and references. Discussion of such publications herein is given for more complete background of the scientific principles and is not to be construed as an admission that such publications are prior art for patentability determination purposes.

Wireless sensors and networks of wireless sensors will be used to 1) monitor the structural health of buildings, bridges and aircraft, etc.; 2) monitor the environment, such as in domestic and commercial buildings, and military and homeland security installations; and 3) control industrial processes for increased autonomy, as well as for other tasks. These systems will find use in factory automation, process and environmental control, security, medicine, and condition-based maintenance, as well as in defense applications and intelligence gathering. Widespread use of wireless sensors will improve safety, increase security, lower heating, ventilation and cooling (HVAC) costs, and increase manufacturing efficiency.

Such wireless sensor systems will typically: 1) require numerous individual devices (known as nodes or motes) to provide comprehensive monitoring capability; 2) be located in inaccessible places and 3) require long intervals between scheduled maintenance. Periodic maintenance, such as replacing batteries, would clearly increase operating costs (often to prohibitive levels), and could be inconvenient, at best, if it required interruption of a continuous process. For some remote, hostile, or inaccessible locations, any maintenance may be impossible to perform. In the immediate future, energy management and improved battery technologies may mitigate some of these issues, but in the long term there is clearly a need to develop an energy source that can last years with little or no maintenance.

Miniaturized turbines and micro-fuel cells have been proposed as means of meeting long term energy delivery needs for wireless devices. While these systems exploit the high energy density of hydrocarbon fuels, for example, these systems are inherently limited by the need for a means of storing and delivering a consistent fuel supply, as well as advanced thermal management to safely remove waste heat. These challenges can be overcome; however, the plumbing and additional system engineering (also known as the balance of plant) adds considerably to the overall size and complexity of such systems.

There are additional challenges with micro-fuel cells. Most types use hydrogen fuel, as protons diffuse through an electrolyte more easily than other ions. Storing molecular hydrogen presents significant scientific and engineering challenges, and so most systems use other fuels such as hydrocarbons, methanol or formic acid, or natural gas that must be reformed with steam at high temperature (600° C.) to yield hydrogen and CO. These reformers again add engineering complexity and require extensive insulation for both safety and efficient operation. Furthermore, reported data for micro-fuel cells indicate maximum peak power densities on the order of 50 mW/cm$^2$ but with a duration of less than 100 ms. These challenges ensure that combustion and micro-fuel cell power systems will be unable to meet the volumetric energy and power densities needed for severely volume-constrained applications.

Energy harvesters that garner ambient environmental energy (such as light, vibrations, etc.) and convert it to electrical energy are attractive solutions for wireless sensors as they do not need to be replaced, recharged or refueled. Of course, they do not function in the absence of ambient energy (analogous to solar cells at night), and so an energy harvesting power supply must be designed to include some kind of energy storage that can provide back-up power in such situations.

Storage of the energy generated may be accomplished using conventional capacitors, which have very limited energy storage capability ($E=\frac{1}{2}CV^2$, where the capacitance, C, is typically on the order of a few hundred microfarads, and V=3-5V). This approach leaves the system vulnerable to interruptions in the ambient energy source. Although batteries and or supercapacitors have been proposed as alternative storage devices, no design has effectively accommodated the low power available from small energy harvester devices. Conventional battery chargers, for example, will not operate at the low power levels delivered by energy harvesters, and, besides, even in they could, they would waste too much of the input energy. Further, no existing system discloses the use of optimum energy storage elements for different functions (e.g. back-up power, pulse power, etc.).

Finally, a major challenge that faces wireless sensor nodes is the asymmetry of the power demands of sensing, processing, communication and sleep functions—on the order of four orders of magnitude. Because communication functions draw relatively high power levels (typically from tens to a few hundred milliWatts), wireless sensor nodes are designed to communicate infrequently (for example, once a minute to once an hour), reverting to a low-power sleep state to extend battery life. In order to meet high power communications loads, the usual approach is to design a power source large enough to handle the highest power load. Unfortunately, energy harvesting devices and batteries typically have low power densities, and so power sources are typically oversized for most of the operating needs of the system.

There is, therefore, a need for a simple and compact system which combines energy generation via harvesting of ambient energy sources with energy storage to provide back-up power, and deliver high power pulses as needed.

SUMMARY OF THE INVENTION

Disclosure of the Invention

The present invention is a method for delivering power to a load, the method comprising the steps of collecting charge from an energy source, boosting the voltage of the collected charge with a charge pump, controllably charging a supercapacitor to a threshold voltage, controllably charging a battery from the supercapacitor, and delivering power from the supercapacitor to a load. The voltage of the collected charge is preferably less than half of the threshold voltage, and optionally approximately one fourth of the threshold voltage. The threshold voltage is preferably programmable. The method preferably further comprises the step of switching a second supercapacitor from being in parallel with the supercapacitor to being in series with the supercapacitor, which step preferably comprises delivering power at a delivery voltage, preferably approximately twice the threshold voltage, higher than the threshold voltage to the load or to charge the battery. The method preferably further comprising the step of switching at least two capacitors in the charge pump from being in parallel to being in series. The step of controllably charging a supercapacitor preferably comprises adjusting the rate of the switching step based on a parameter selected from the group consisting of the charging rate of the supercapacitor and the power level of the energy source. The method preferably further comprises the step of conditioning charge pump gate voltages, preferably comprising saturating one or more FETs in the charge pump. The method preferably further comprises the step of recharging the supercapacitor from the charge pump when power from the energy source is available, and preferably further comprises the step of recharging the supercapacitor from the battery when power from the energy source is unavailable.

The present invention is also an apparatus for delivering power to a load, the apparatus comprising at least one energy source, a charge pump for boosting a voltage of charge collected from the energy source, a control module, a battery, and one or more supercapacitors for charging the battery and delivering power to a load, wherein the control module controls charging of the supercapacitors to a threshold voltage by the charge pump. The voltage of the collected charge is preferably less than half of the threshold voltage, and optionally approximately one fourth of the threshold voltage. The control module is preferably programmable. The supercapacitors are preferably switched to being arranged in series for delivering power at a delivery voltage higher than the threshold voltage to the load or to charge the battery. The delivery voltage is optionally approximately twice the threshold voltage. The control module preferably adjusts the rate of switching capacitors in the charge pump based on a parameter selected from the group consisting of the charging rate of the supercapacitors and the power level of the energy source. The apparatus preferably further comprises a FET gate conditioner circuit for saturating one or more FETs in the charge pump. The supercapacitors are preferably recharged from the charge pump when power from the energy source is available, and preferably recharged from the battery when power from the energy source is unavailable.

An object of the present invention is to provide a system for harvesting, generating, storing, and delivering energy, particularly for remote applications.

An advantage of the present invention is that it can effectively store charge from very low power or low voltage energy sources while still providing power to a load at higher voltages.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 4(*b*) is a graph showing the output voltage from a solar cell and supercapacitor in parallel;

FIG. 4(*c*) is a graph comparing voltage droop under load for a lithium battery and a lithium battery and supercapacitor in parallel;

DESCRIPTION OF THE PREFERRED EMBODIMENTS

Figure 1:
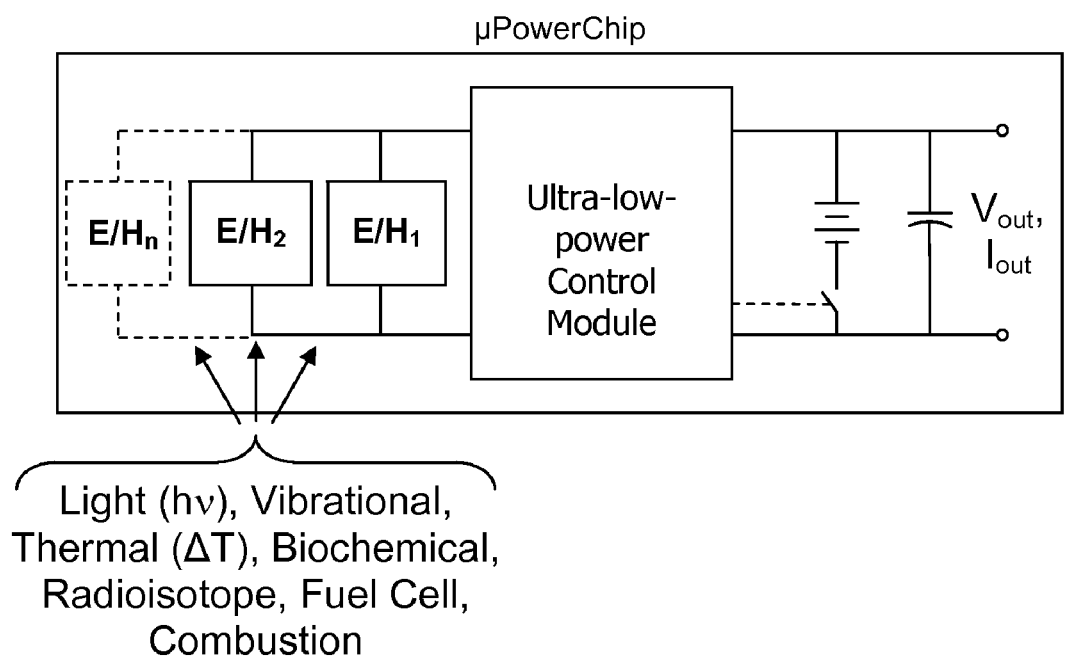
FIG. 1 is a schematic diagram of an embodiment of the present invention.

Best Modes for Carrying Out the Invention

The system of the present invention is a compact long lifetime power source which will enable the implementation of many applications, including but not limited to wireless network systems, that will no longer require battery changes or replacement. The present invention preferably comprises several components including energy storage (including but not limited to batteries and supercapacitors), energy harvesting and/or generation sources (including but not limited to vibrational (piezoelectric, capacitive or inductive), thermal (thermoelectric), radioisotope (betavoltaic), solar (photovoltaic), fuel cells, microcombustion, or biochemical sources), and ultra-low power electronics for functions including but not limited to charging of energy storage devices, power conditioning, rectification, power management, monitoring state of charge, and/or voltage step-up. The present invention may be configured using different combinations of the above components depending on the intended application. The energy harvesting component will generate power from the ambient environment, which power is then preferably stored in the energy storage components. The ultra-low power electronics preferably control how this power is used or delivered. The present invention can be packaged in many common form factors (battery sizes such as AA, AAA, C, D, 9V, etc), as well as in custom sizes, and are preferably capable of plugging directly into a wireless system/component, just like a battery, in order to provide a long lifetime power source.

The present invention preferably combines energy harvesting, energy storage in (for example) batteries and supercapacitors, and ultra-low power electronics to condition the output from the harvester and carefully charge the storage devices. Batteries (or microbatteries) provide back-up energy to accommodate periods without ambient energy, while supercapacitors (or microsupercapacitors) provide excellent power delivery capabilities to handle high and/or pulsed loads. The electronics circuitry is preferably designed to draw only a very small portion of the harvested energy so that the remainder may be directed for storage, as described above, or for immediate use by the system it is powering. Furthermore, once it is fully charged, the battery can be switched out of the circuit to serve as a back-up source, and the energy generated by the harvester is then preferably used to power the application load (i.e., sensor) and accommodate any charge leakage in the supercapacitor.

Because it is harvesting energy from its environment, the present invention provides a long-lived energy source, far out-lasting conventional batteries. The system may be designed to have a custom form factor or to fit a standard battery configuration, including but not limited to AA, AAA, 9V, Li123, C, D, and others, so it can be used in systems already configured for these types of batteries with little to no modification. Moreover, as advanced packaging and integration technologies deliver smaller sensor nodes, the present invention is also expected to evolve through similar miniaturization strategies and will, therefore, be compatible with future generations of miniaturized sensors.

As used throughout the specification and claims, the term "battery" means battery, microbattery, thin film battery, and the like, whether planar or volumetric. As used throughout the specification and claims, the term "supercapacitor" means capacitor, supercapacitor, microsupercapacitor, microcapacitor, ultracapacitor, electric double layer capacitor (EDLC), and the like. As used throughout the specification and claims, the term "energy source" means an energy harvester or energy generator, such as vibrational (including piezoelectric, electrostatic and inductive methods), thermal (thermoelectric), solar (various forms of photovoltaics), radioisotope, chemical, biochemical, fuel cell, microturbine, adenosine triphosphate (ATP) converters (ATP is a biomolecule able to store and transport chemical energy within cells), magnetic, electromagnetic (or RF) induction (EMI), and microcombustion generators and the like.

FIG. 1 shows a broad schematic of the present system, which preferably comprises three sections: energy harvesting and/or generation (E/H), energy storage, and control electronics to rectify the input power (if necessary) and safely charge the storage devices. Energy generation and/or harvesting may be accomplished using a hardware component which is capable of converting ambient energy into electrical energy. The present invention may contain one or more units of the same type of energy harvesting hardware (for example, two vibration harvesters), or contain a combination of two or more pieces of hardware capable of different types of energy harvesting (for example one piece of hardware harvests vibrational energy while another piece of hardware harvests thermal energy). Using two or more energy harvesting components may provide higher levels of available power and/or may decrease the likelihood that the system will be subjected to periods of time with no available harvestable ambient energy.

The electrical energy from the harvester(s) is stored, initially, in a supercapacitor (or supercapacitors), then in a rechargeable battery. These two energy storage devices provide complementary features: supercapacitors deliver energy efficiently (high specific power), while batteries store energy efficiently and so provide back-up power when the harvester is not providing enough power. The supercapacitors in the system of the present invention are preferably used as the first stage energy storage component because they can be discharged and recharged more efficiently and more often than batteries, and are also preferably used for energy delivery because of their low impedance.

A low-power digital control module (DCM) preferably monitors the state of charge (SOC) of both the battery and supercapacitor(s), and simultaneously dynamically adjusts the operation of the charging module to accommodate any fluctuations in the level of energy delivered by the harvester(s). The Digital Control Module is preferably programmable and preferably comprises a microcontroller. As used throughout the specification and claims, the term "control module" means a DCM, an ultra-low power microcontroller, a low power Field Programmable Gate Array (FPGA), a low power microprocessor, programmable logic designed into an Application Specific Integrated Circuit (ASIC), and the like. The charging module in the present invention preferably comprises a charge pump, but could include other devices and architectures such as piezoelectric transformers, dc-dc converters and the like. Should the incoming energy not be sufficient to recharge the supercapacitors, the control module preferably switches in the battery to maintain charge on the supercapacitor. Because energy harvesters only produce very small amounts of power, this circuitry (the charge pump, in particular) preferably operates extremely efficiently to transfer as much of the available power as possible to the energy storage devices without wasting it in the charger.

The use of a control module imparts capabilities to the system that conventional power sources such as batteries and other energy harvesting power supplies do not provide. For example, in addition to monitoring the SOC and the input energy source, it can provide state of health monitoring for the whole system, as well as communication with the host sensor or application. For example, with appropriate sensor hardware, the control module may optionally detect a sharp temperature excursion or an unusual vibration pattern that may indicate a tamper event, optionally triggering power down. For sensors, communications with the host sensor mote could enable sophisticated system management capabilities not possible with other power solutions. For example, the complex interaction of SOC and input energy variables may be used to determine whether the sensor should enter power conservation or power down modes.

As discussed, energy storage is preferably accomplished using at least one secondary (rechargeable) battery (including but not limited to lithium-ion, lithium polymer, thin film lithium ion, nickel metal hydride (NiMH), and nickel/cadmium (NiCd)) preferably in combination with at least one supercapacitor (also known as an ultracapacitor or electrochemical double layer capacitor (EDLC), comprising, for example, aqueous or organic based electrolyte chemistries and symmetric or asymmetric types). The energy storage components of the present invention preferably store the energy generated by the harvester components for use at a later time. The different characteristics of batteries and supercapacitors make them suitable for different functions of energy storage and delivery. If the energy must be stored for a long time, and released slowly, for example as back-up in case there is no harvestable ambient energy (e.g., at night when the energy harvester is a solar cell), a battery would be the preferred energy storage device. If the energy must be delivered quickly, as in a pulse for a radio frequency (RF) communication module, but long term storage is not critical, use of a supercapacitor is preferable. The system can employ i) a battery (or several microbatteries) alone, ii) a supercapacitor (or supercapacitors) alone, or iii) any combination of batteries, microbatteries and supercapacitors appropriate for the application of interest.

Figure 2:
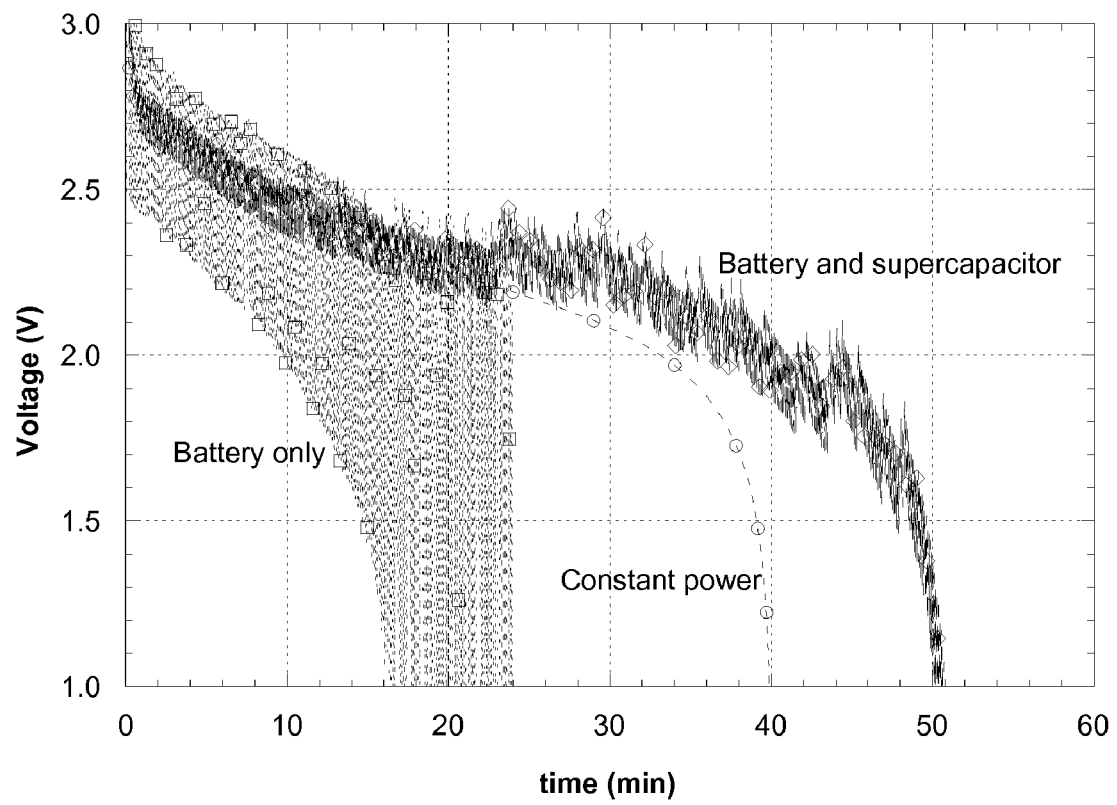
FIG. 2 is a comparison of battery discharge under i) pulsed load, ii) continuous averaged load, and iii) pulsed load with supercapacitor.

Improvements in materials, construction, etc. for lithium ion and some lithium polymer batteries are resulting in devices that are capable of delivering pulsed loads as well as steady state loads. These devices may be capable of fulfilling both back up and pulse load delivery functions which are currently preferably accomplished using a combination of microbatteries and supercapacitors. However, as shown in FIG. 2, in order to maximize the life of the battery, separate devices preferably fulfill these functions. FIG. 2 shows pulsed load delivery from a CR2320 lithium coin cell; the pulses are 105 mW with a 1.5 second pulsewidth and 5 second repetition rate. The lifetime of the battery when used with a supercapacitor is greatly increased over that of a battery when used alone.

The present invention may use commercially available (off-the-shelf) batteries and supercapacitors or custom designed devices depending on the anticipated usage parameters of the system. Parameters that may influence energy storage selection include the power profile, availability and consistency of ambient energy and environmental conditions such as temperature and humidity. Moreover, some novel thin film batteries exist, both as research devices and commercial products (e.g., Oak Ridge Micro and PowerPaper). These devices tend to have high discharge rate (high power) capability, but their capacity values on a per unit area basis are low, meaning that large footprint devices are needed to meet useful energy storage capabilities. For certain applications, these devices may prove to be appropriate. One embodiment of the present invention may combine a volumetric battery for energy back-up with a thin film battery in place of the supercapacitor to provide pulse power.

Figure 3:
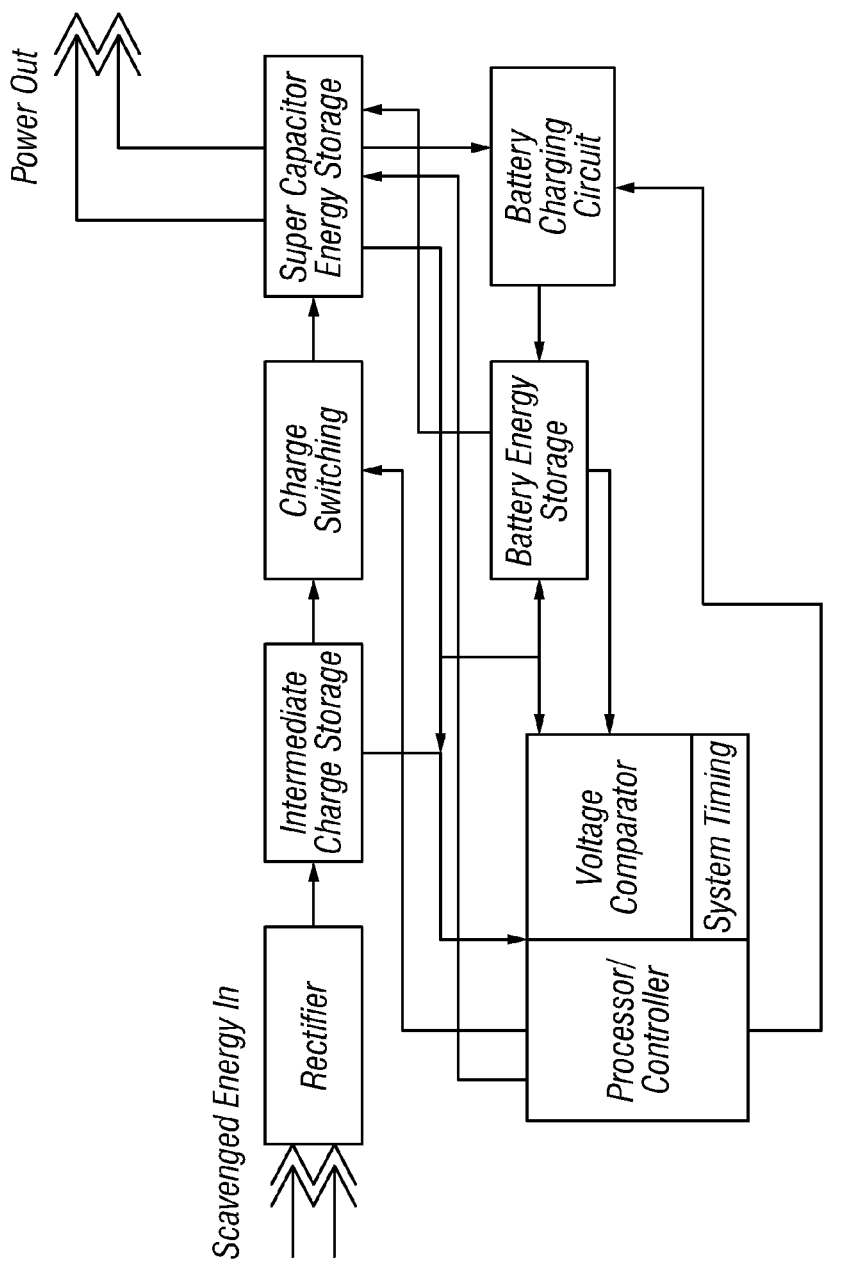
FIG. 3 is a block diagram showing control electronics.
Figure 3:
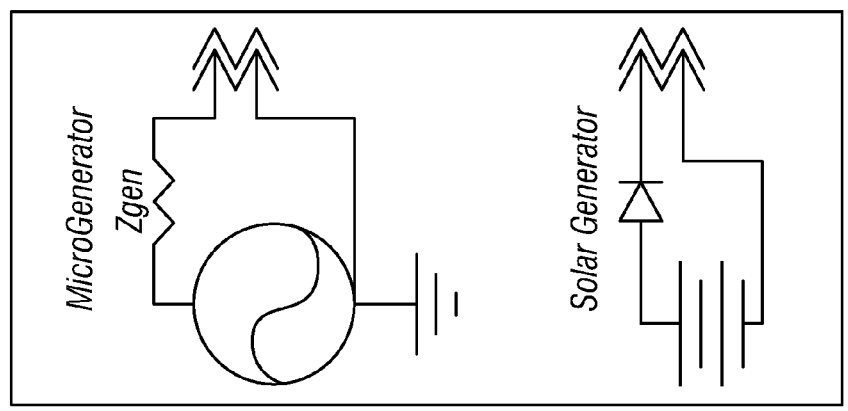
Figure 4A:
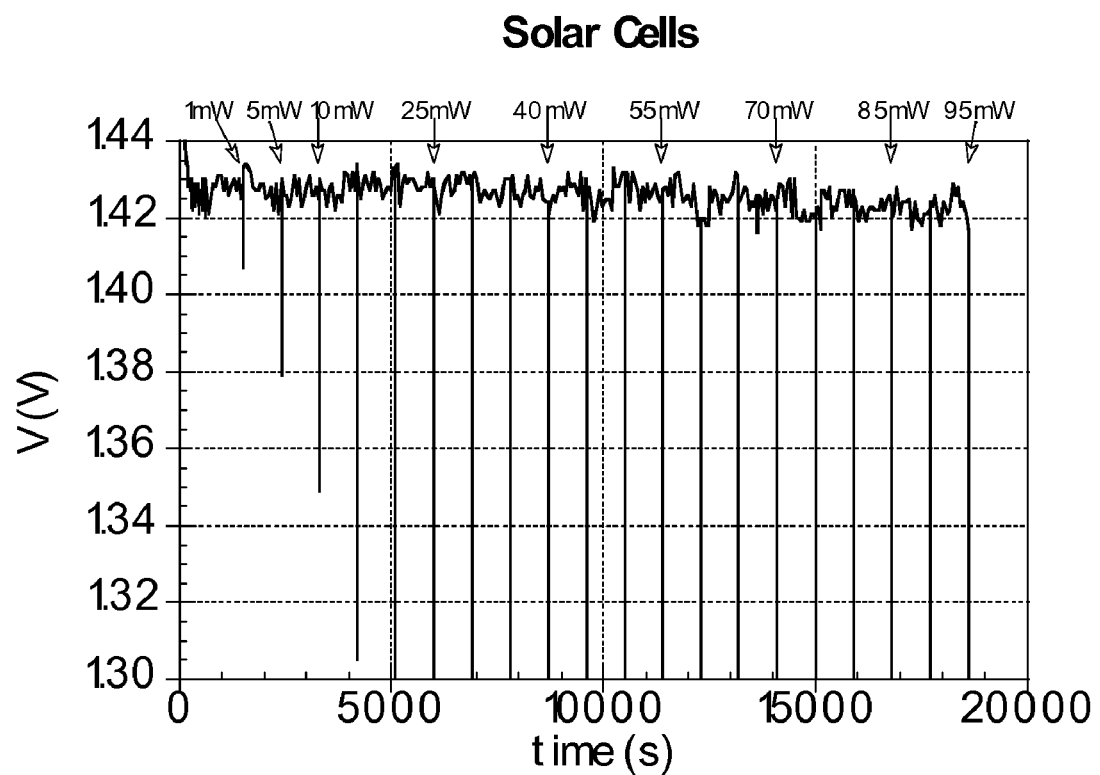
FIG. 4(*a*) is a graph showing solar cell output voltage under increasing pulse loads.
Figure 4B:
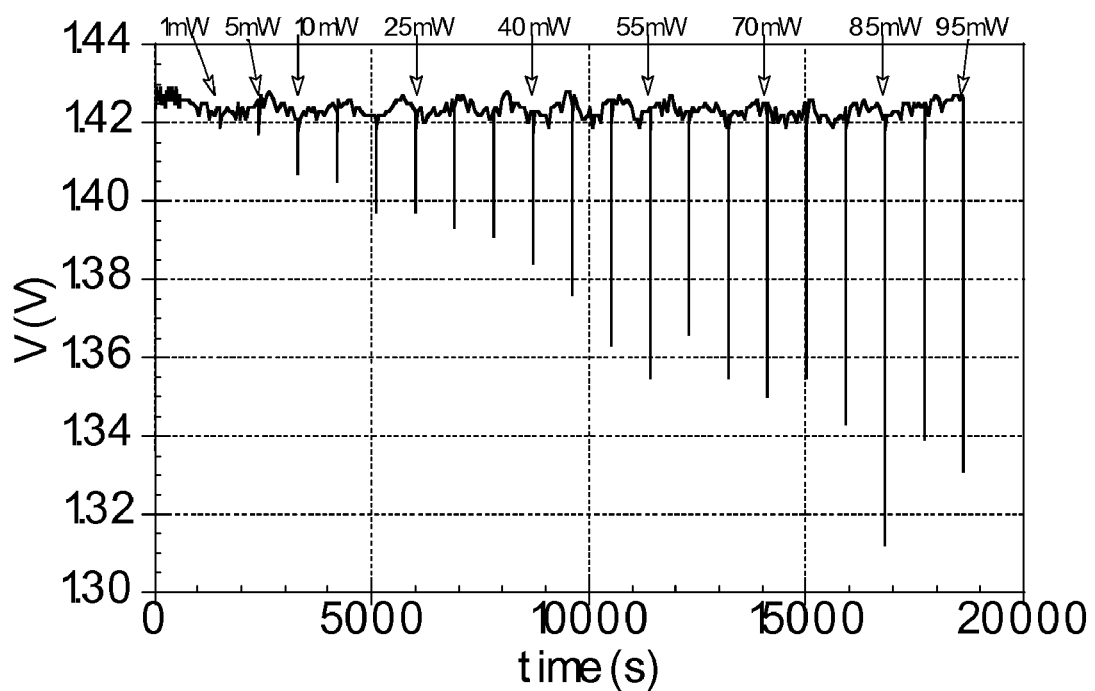
Figure 4C:
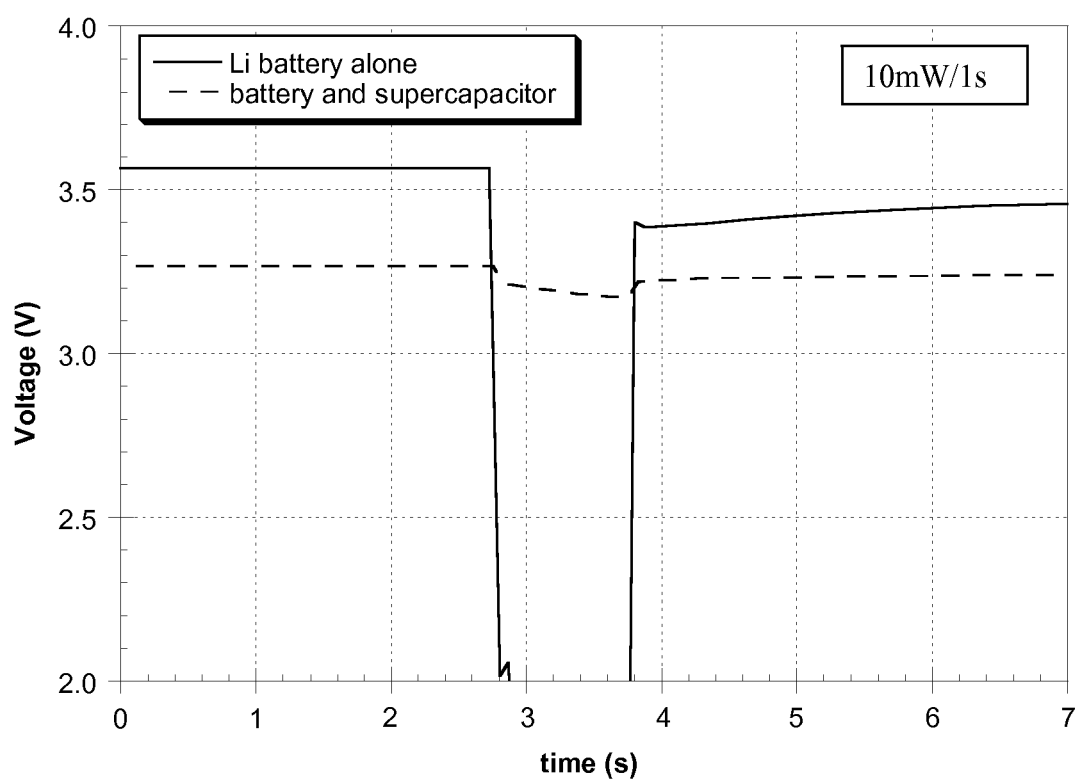

FIG. 3 shows a more detailed block diagram of the device. The circuitry will operate for both AC (e.g., vibration, rotational) and DC (e.g., solar, thermal) sources. An incoming AC signal is rectified preferably using low forward-bias-voltage diodes to minimize losses. These may comprise silicon Schottky diodes, germanium p-n diodes or other specially engineered components. The control electronics circuitry primarily fulfills two functions: determining how the energy generated by the energy-harvesting component is to be directed (to storage and/or directly to the load) and safely and efficiently charging the energy storage devices without overloading, overcharging, or otherwise damaging them or the generator. It is preferred that the circuits consume very little of the incoming power. Small scale energy harvesters that are of interest for use in wireless sensors and other microsystems generally deliver low levels of power (typically on the order of a few hundred microWatts). It is important that the charging and power management circuitry delivers as much of that power as possible to the energy storage or the sensor device rather than consuming it in its own operation.

The circuitry preferably comprises a charge-switching module for charging a supercapacitor energy storage device and a battery charging circuit, controlled by the control module. Energy for operation of the control module is preferably stored in an intermediate energy storage device, for example a conventional capacitor (typically a few μF to a few hundred μF). The charge switching module preferably prevents irreversible damage to the supercapacitors (for example C19 and C21 in FIG. 7) by carefully controlling their charging in order to avoid overcharging them past a desired threshold voltage, preferably approximately 3.3V. During charging, supercapacitor C21 optionally provides low-voltage power to the load, or alternatively the control module may optionally switch output power off until the supercapacitors reach the desired charging threshold.

Connecting a supercapacitor directly to an energy source delivering voltage V will draw a current I equal to V/ESR, where ESR is the equivalent series resistance of the supercapacitor (typically a few Ohms, and ideally $\ll 1\Omega$). As a low ESR is a desirable characteristic of supercapacitors for power delivery, the supercapacitor would draw a high instantaneous current, overloading the energy source. As the system of the present invention may sit on the shelf for some time before being deployed, it is not possible to store the supercapacitor in the charged state, and the charge-switching module preferably controls the current draw in order to prevent damaging the generator on initial deployment.

Once they are fully charged, the supercapacitors then preferably serve as an energy "cache" for charging the battery. This keeps the average current draw very low. Before charging the battery, the parallel supercapacitors are preferably intermittently switched in series to increase the voltage. Then the battery, for example a Li-Ion battery, is charged, preferably in two stages. First, a constant current charge increases the battery voltage until a target voltage (for example 4.2V), preferably monitored by the control module, is reached. This stage usually delivers about 70% of the total capacity of the battery. The battery is then trickle-charged at a constant voltage. Charging is typically terminated once the current level falls below 10% of the initial charging current.

By employing a control module that operates at extremely low power, various functions or conditions of the present system can be periodically monitored both during the charging cycles and during operation, including but not limited to the state of charge of both the battery and supercapacitor and whether or not the generator is producing power. Once the battery is fully charged it may be removed from the circuit so that the present invention provides power to the sensor or other load via the energy source and supercapacitor(s) only. If the control module detects that the energy cell has ceased to provide power (e.g. during periods of darkness in the case of a solar cell, or in the case that ambient vibrations cease), then the control module preferably switches in the battery to provide back-up power. In this case, the battery preferably trickle charges the supercapacitor and provides quiescent power to the sensor until the ambient energy source is restored. The battery is preferably designed to be able to store sufficient energy to provide back-up power for the entire time the system is anticipated to be without ambient energy. This time would vary for different applications, but may range from a few hours to several days or weeks. In the event that the stored energy in the battery drops below a predetermined level, a low battery condition is preferably communicated to the sensor, allowing the sensor to shut down or go into a power conservation mode, for example.

Finally, current is preferably delivered to the load through the supercapacitor which can supply both steady state and high power pulse current, depending on the demand from the load. For steady state operation, the energy source (or the battery if there is no energy from the generator or harvester) preferably delivers energy to trickle charge the supercapacitor, and compensates for the energy delivered to the load or lost through the supercapacitor's internal leakage. As discussed previously, the supercapacitors' low impedance makes them well suited for delivering high power bursts when needed by the load.

Thus, the present invention preferably utilizes one or more supercapacitors as primary energy storage devices, and one or more batteries as secondary energy storage devices, which are preferably used to recharge the supercapacitor(s). The primary energy storage device preferably provides a higher power output than the secondary storage device, while the secondary storage device provides a greater total energy storage than the primary device. That is, the load is preferably powered only from the supercapacitor(s), and not from the battery. The supercapacitors can deliver both pulsed and steady state power, depending on the requirements of the load, and have higher power delivery and lower Equivalent Series Resistance than the battery, thereby increasing efficiency (especially for pulsed power applications). In the present invention, the battery (secondary storage device) is used to charge the supercapacitor(s) (primary storage device). This configuration also permits the use of supercapacitors with reduced capacitances, and thus reduced leakages, enabling charging from low power energy sources.

Preferred features, advantages and benefits of the present invention, listed in Table 1, address concerns that manufacturers and end users of wireless sensors and other applications have identified as potential barriers to adoption of this kind of technology. For example, while not having to change batteries periodically is desirable for many wireless sensor applications, the vulnerability of energy harvesting to a lack of ambient energy (e.g., darkness for solar cells) is also concern for many users. The present invention addresses these concerns at low cost.

TABLE 1

| Feature | Advantage | Benefit |
| --- | --- | --- |
| Harvests ambient energy | No need to change batteries, recharge, or refuel | Reduced system maintenance costs |
| Provides steady state, pulse and back-up power | Enables cold start, offers redundancy in the case of ambient energy failure, and efficiently delivers pulse power | Reduces system vulnerability and system size |
| Small form factor | Can be designed into standard or custom shapes | Can be plugged in to customers' existing products |
| Flexible source of input energy | Similar products can be used in different applications with little reengineering | Flexible, broad product line that can be used in different environments - e.g., industrial, commercial, and residential |

Circuit Diagrams

Electronics of the present invention preferably convert ultra-low power from environmental sources into higher voltage, high power output power with smart, programmable control. The present invention preferably accepts either AC or DC power input with voltages as low as approximately 1.5V, and current as low as approximately 5-15 µA, and preferably employ dynamic self-modification of the conversion control to efficiently convert and store the input energy in high energy density supercapacitors and backup batteries. The voltage regulation of the present invention is preferably not dependent on the maximum voltage supplied by the energy source used, and is preferably programmable to provide steady state DC output voltages up to 5VDC or greater with current output many orders of magnitude greater than that of the input after storage. The present invention is preferably programmable to provide any desired voltage (not only one or two discrete voltages), either at the time of delivery or in the field. Thus the same system can be used for a wide range of loads and energy storage elements suitable for use in different applications.

Figure 5:
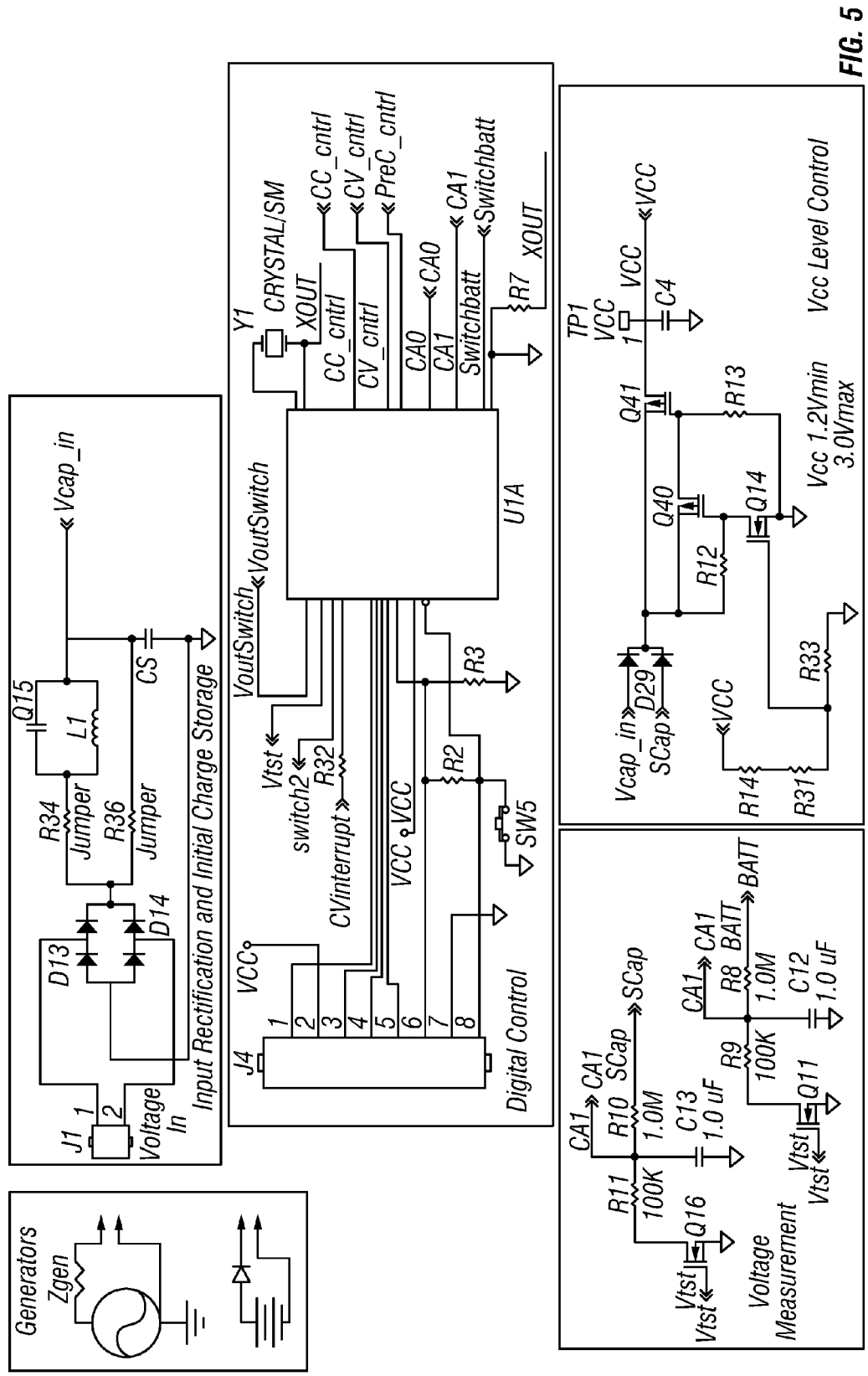
FIG. 5 displays circuits for implementing the present invention.

As shown in FIG. 5, the present invention preferably accepts and rectifies AC or DC current input into an initial charge storage capacitor. The present device also preferably uses a charge pump with dynamically self-modifying switch rates to very efficiently transfer the charge into one, two, or more high-energy-density capacitors (or supercapacitors) at up to about four times the highest input voltage. The dynamic switch rate of the charge pump is preferably controlled by the control module. The control module preferably measures the relevant voltages and controls the switching rate of the charge pump, the final voltage level of the stored energy, and the charging of the backup battery module.

The control module preferably dynamically controls the operation of the charge pump to efficiently store very low power energy from the energy source(s). For dynamic control of the charge pump switch rate, the control module preferably periodically measures the supercapacitor voltage and computes the rate-of-change of the voltage. If the rate is above a specified level, the switch rate is preferably kept sufficiently high to pump as much charge as is available. If the voltage rate-of-change falls below that level, the switch rate is preferably correspondingly decreased so that the charge pump supercapacitors can maintain 90% of the highest voltage level prior to switching. As the supercapacitor voltage increases, the potential differences in the charge pump decrease, and so the control module preferably further decreases the switch rate in order to accumulate as much charge as possible in the switching capacitors prior to the switch cycle. Also, if the current available at the source increases, the control module preferably senses this as the voltage storage rate increases, and preferably increases the switch rate dynamically as before, in order to take advantage of the greater available quantity of charge flow.

If more than one supercapacitor is used, the supercapacitors, when charged to the programmed final voltage level, may optionally be switched in series to provide twice the voltage for subsequent backup battery charging via the battery charging circuit, or for higher voltage output. Power output (on or off) and battery charging is preferably controlled by the control module. When input power is unavailable, the control module may be programmed to turn off the output or recharge the supercapacitors from the backup battery module for continued operation.

In general, the charge pump of the present invention stores low level charge obtained from the energy source(s) and boosts the voltage, enabling the supercapacitor to charge at the higher voltage level. In contrast, the charging voltage of many existing systems is limited to the output voltage of the energy source, whatever that may be. For low power energy sources, for example a solar cell exposed only to low light, this voltage may not be sufficient to charge the supercapacitor to its threshold voltage (for example due to leakage of the supercapacitor). Thus these other systems simply won't work with low voltage or low power energy sources. The charge pump preferably incorporates intermediate charge storage for increased efficiency, and preferably does not utilize resistors for signal control or limiting. Other designs as described in the prior art use resistors or inductors for voltage control between the energy source(s) and the energy storage components, resulting in limited current flow and therefore lower efficiency, or use no voltage control at all. In addition, it is preferable that the charge pump comprises MOSFETs, which require voltage, not current, for switching.

Figure 6:
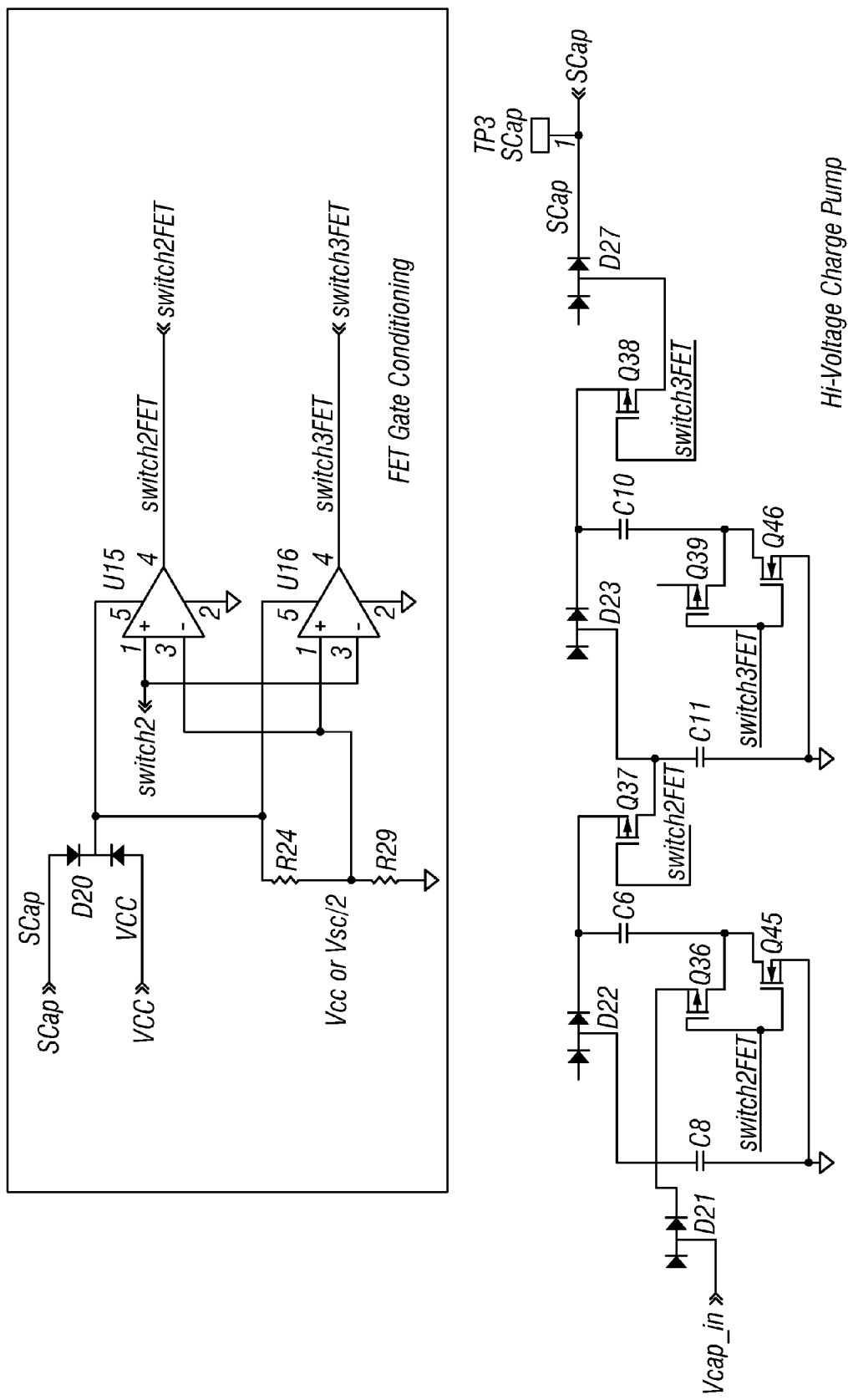
FIG. 6 depicts Voltage Charge Pump and FET Gate Conditioner circuits of the present invention.

The embodiment of the high voltage capacitive charge pump pictured in FIG. 6 preferably follows an input voltage rectifier. The operation of the charge pump is preferably dynamically controlled by the control module (FIG. 5), based on the voltage level of the supercapacitors C19 and C21 measured by the control module.

The capacitors C6, C8, C10, C11 in the charge pump preferably have a low capacitive value and low leakage, allowing the system to scavenge low charge levels presented by both high impedance, low power environmental generators such as piezoelectric vibration sources, as well as low impedance higher available charge generators such as photovoltaic cells under a high intensity source. In order to present the supercapacitors with a high charging voltage, the flux of current from the charge pump capacitors during switching is preferably controlled by the switching rate, which is preferably dynamically changed with time by the control module. For example, when little charge is available from the generators, the switch rate is preferably decreased. When there is ample charge available, the switch capacitors achieve their final value very quickly, and the switch rate is preferably increased. This dynamic control allows the system to take advantage of very low levels of ambient energy while maintaining a high charge voltage into the supercapacitors.

If desired, the storage capacitors C6, C8, C10 and 011 in the charge pump are switched from parallel to series preferably by using low resistance, low gate-source voltage MOS-FETS. To increase the efficiency of the transistors, the gate signals are preferably conditioned by ultra-low current op-amps U15 and U16, thereby increasing transistor saturation and decreasing the channel resistance. When the control module determines that the desired system voltage level has been obtained, or conversely that no energy is available at the input, switching of the charge pump is preferably halted to conserve power.

In greater detail, an embodiment of the Voltage Charge Pump circuit of the present invention, shown in FIG. 6, is preferably operated by switching off FET Q45 and switching on FETs Q36 and Q37, thereby switching capacitors C8 and C6 from parallel into series and providing a current flow path to charge capacitors C11 and C10 in parallel with FET Q46 on and FETs Q39 and Q38 off. The gates of Q36, Q45 and Q37 are preferably exactly out of phase with the gates of Q39, Q46, and Q38.

After the charge is transferred into C11 and C10 at the higher voltage, the process is preferably reversed, with FETs Q36 and Q37 turning off and Q45 turning on so that capacitors C8 and C6 are recharged in parallel, while simultaneously FET Q46 is turned off and Q39 and Q38 are turned on, thereby switching capacitors C11 and C10 from parallel into series and providing a current flow path discharging C11 and C10 into the supercapacitors through diode D27 at the higher voltage. Diodes D22 and D23 block the back-flow of charge from capacitors C6 when in series with C8, and C10 when in series with C11. Diode D21 blocks the back-flow of charge from capacitors C8 and C6.

An FET Gate Conditioner circuit is also depicted in FIG. 6. Saturation of the charge pump switching FETs is typically only possible with gate-source voltage levels that go as high as the highest levels seen by the sources of the respective transistors. This is preferably accomplished with gate voltage conditioning provided by the FET Gate Conditioner circuit. This circuit preferably takes the digital voltage switching signals provided by the control module, utilizing ultra-low-power operational amplifiers in the saturated or comparator mode, or alternatively transistors in a totem-pole configuration, to swing the signals to the positive rail provided by either (1) VCC when the supercapacitors are at low voltage and charging, or (2) the supercapacitor voltage when it exceeds VCC. This higher gate-source voltage differential preferably saturates the FETs in the charge pump when switching, allowing for the low channel impedances necessary for highly efficient switching with very low current drain. This action preferably allows the charge pump to operate on very small quiescent current, enabling the pump to charge to higher voltages with less input power.

Figure 7:
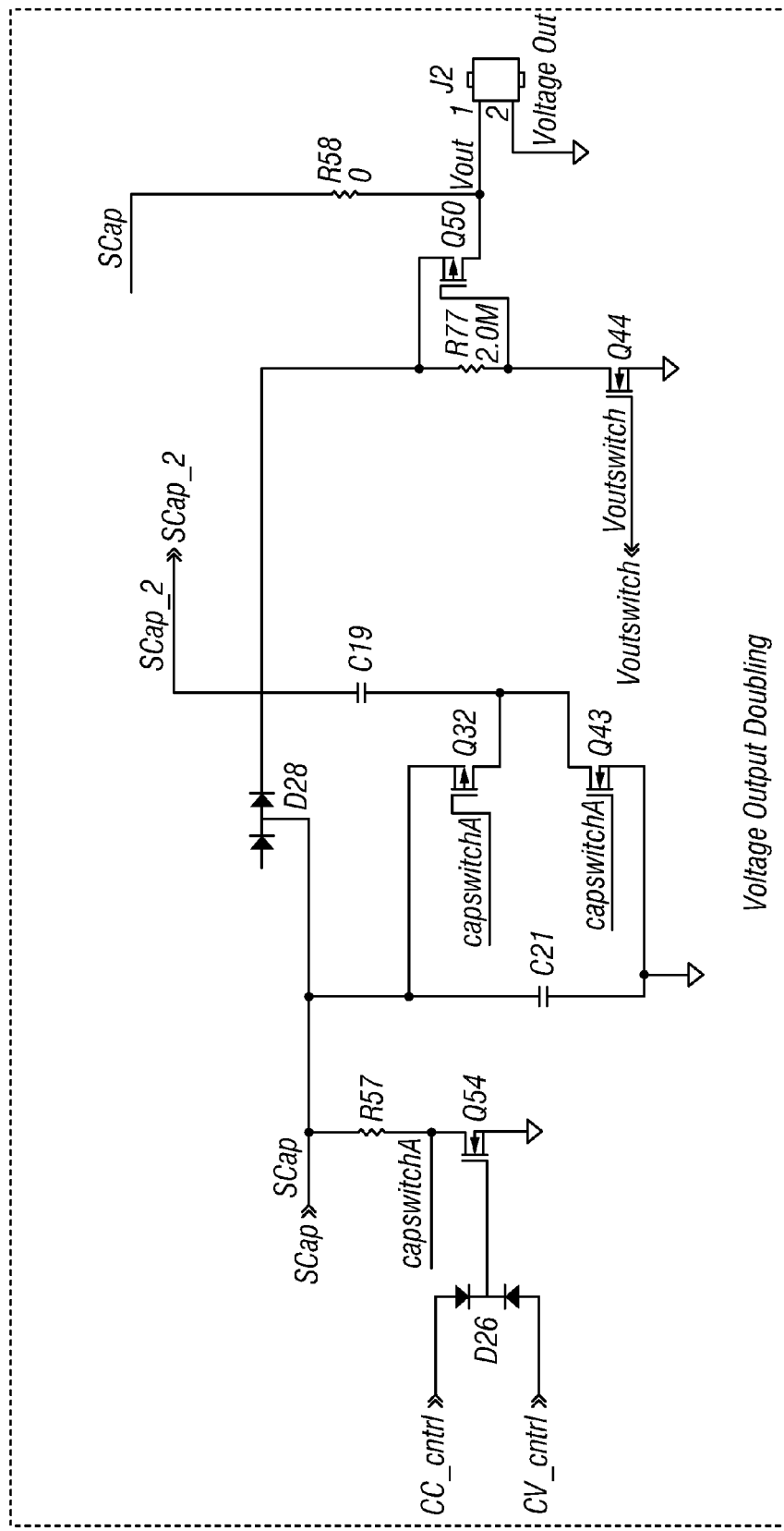
FIG. 7 shows a voltage output and doubling circuit of the present invention.

When necessary, the control module may switch the energy storage supercapacitors into series, at least doubling the output voltage at high power levels. This action can drive higher voltage loads, or provide the higher voltage necessary for backup battery charging. In this case, a Voltage Output and Doubling Circuit, shown in FIG. 7, is preferably employed. The signal preferably drives low the gates of FETs Q32 and Q43, thereby switching the capacitors C21 and C19 into series. Diode D28 blocks the back-flow of current from C19 to C21. An output signal from the control module preferably drives high the gate of FET Q44, pulling low the gate of FET Q50, turning on the output of power from C19 to the output pin.

Figure 8:
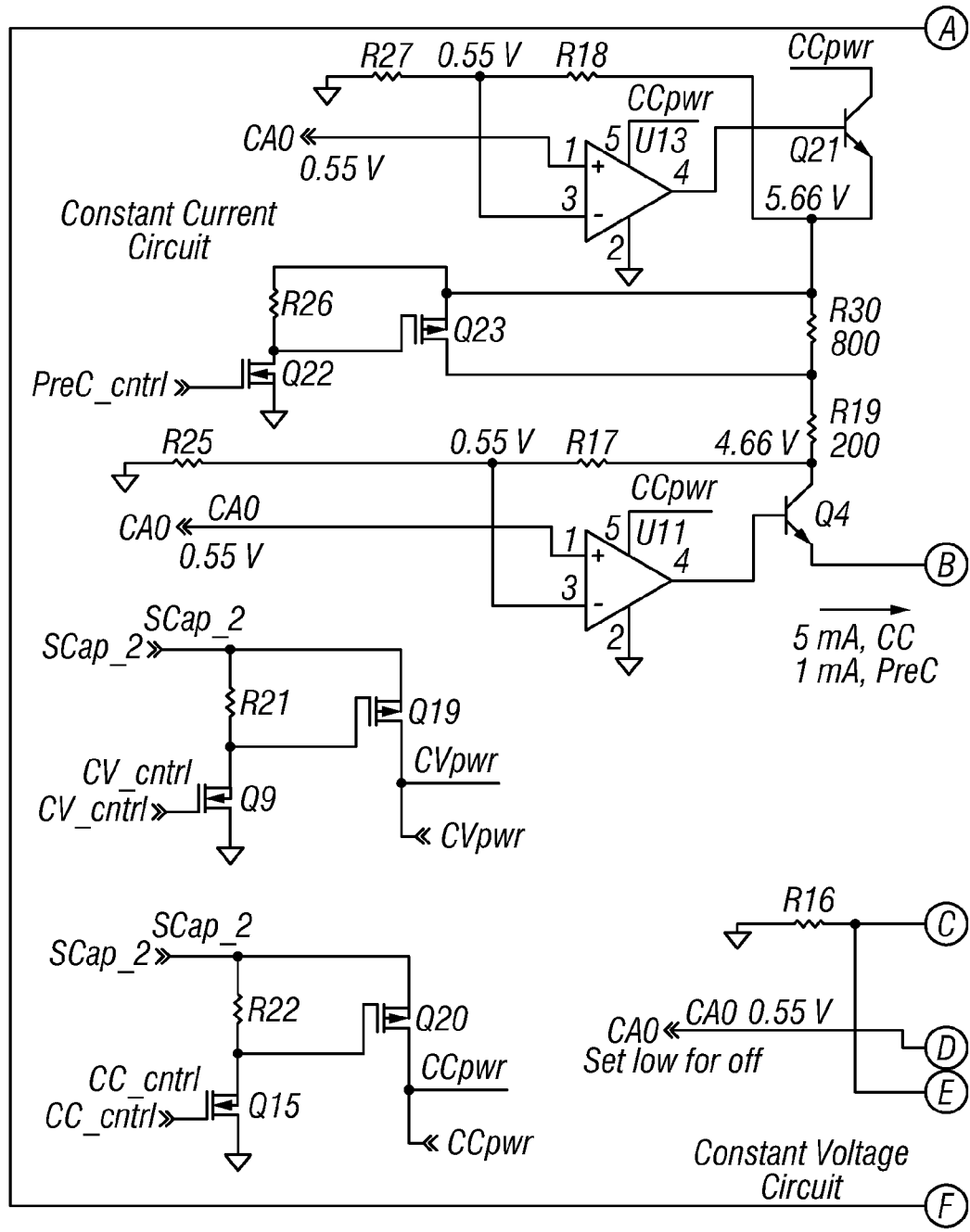
FIG. 8 is a circuit diagram showing a backup battery charging module.
Figure 8:
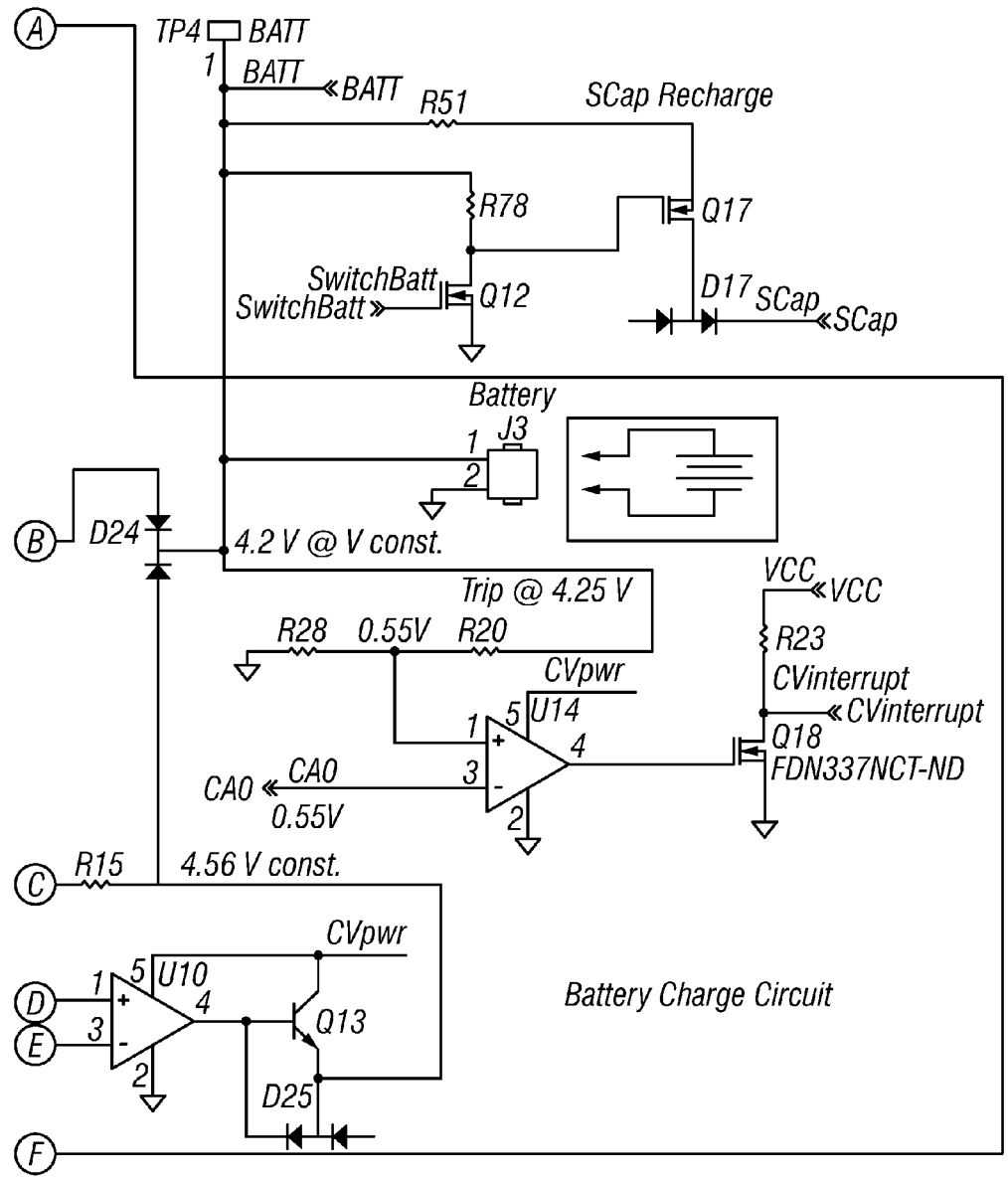

FIG. 8 depicts an embodiment of a Backup Battery Charging Module circuit, which preferably provides the voltages and currents necessary to charge the backup battery module as described above. Unlike other implementations of charging circuits, which often use power hungry transformers, this circuit preferably comprises low power op-amps.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for delivering power to a load, the method comprising the steps of:
    collecting charge from an energy source;
    boosting a voltage of the collected charge;
    controllably charging a supercapacitor to a threshold voltage;
    controllably charging a battery from the supercapacitor; and
    delivering power from the supercapacitor to a load.

2. The method of claim 1 wherein the voltage of the collected charge is less than half of the threshold voltage.

3. The method of claim 2 wherein the voltage of the collected charge is approximately one fourth of the threshold voltage.

4. The method of claim 1 wherein the threshold voltage is programmable.

5. The method of claim 1 further comprising the step of switching a second supercapacitor from being in parallel with the supercapacitor to being in series with the supercapacitor.

6. The method of claim 5 wherein the switching step comprises delivering power at a delivery voltage higher than the threshold voltage to the load or to charge the battery.

7. The method of claim 6 wherein the delivery voltage is approximately twice the threshold voltage.

8. The method of claim 1 wherein the boosting step comprising using a charge pump.

9. The method of claim 8 further comprising the step of switching at least two capacitors in the charge pump from being in parallel to being in series.

10. The method of claim 9 wherein the step of controllably charging a supercapacitor comprises adjusting a rate of the switching step based on a parameter selected from the group consisting of a charging rate of the supercapacitor and a power level of the energy source.

11. The method of claim 8 further comprising the step of conditioning charge pump gate voltages.

12. The method of claim 11 wherein the conditioning step comprises saturating one or more FETs in the charge pump.

13. The method of claim 8 further comprising the step of recharging the supercapacitor from the charge pump when power from the energy source is available.

14. The method of claim 1 further comprising the step of recharging the supercapacitor from the battery when power from the energy source is unavailable.

15. An apparatus for delivering power to a load, the apparatus comprising:
  at least one energy source;
  a circuit for boosting a voltage of charge collected from said energy source;
  a control module;
  a battery; and
  one or more supercapacitors for charging said battery and delivering power to a load;
  wherein said control module controls charging of said supercapacitors to a threshold voltage by said circuit.

16. The apparatus of claim 15 wherein the voltage of the collected charge is less than half of the threshold voltage.

17. The apparatus of claim 16 wherein the voltage of the collected charge is approximately one fourth of the threshold voltage.

18. The apparatus of claim 15 wherein the control module is programmable.

19. The apparatus of claim 15 wherein the circuit comprises a charge pump.

20. The apparatus of claim 19 wherein said supercapacitors are switched to being arranged in series for delivering power at a delivery voltage higher than the threshold voltage to said load or to charge said battery.

21. The apparatus of claim 20 wherein the delivery voltage is approximately twice the threshold voltage.

22. The apparatus of claim 19 wherein said control module adjusts a rate of switching capacitors in said charge pump based on a parameter selected from the group consisting of a charging rate of said supercapacitors and a power level of said energy source.

23. The apparatus of claim 19 further comprising a FET gate conditioner circuit for saturating one or more FETs in said charge pump.

24. The apparatus of claim 19 wherein said supercapacitors are recharged from said charge pump when power from said energy source is available.

25. The apparatus of claim 15 wherein said supercapacitors are recharged from said battery when power from said energy source is unavailable.

\* \* \* \* \*